United States Patent [19]

Häfele

[11] 4,274,434
[45] Jun. 23, 1981

[54] AUTOMATIC LOW-FRICTION CHECK VALVE

[76] Inventor: Carl-Heinz Häfele, Bergstrasse 83, 4050 Mönchen-Gladbach 1, Fed. Rep. of Germany

[21] Appl. No.: 156,954

[22] Filed: Jun. 6, 1980

Related U.S. Application Data

[62] Division of Ser. No. 969,527, Dec. 14, 1978, abandoned.

[30] Foreign Application Priority Data

Dec. 22, 1977 [DE] Fed. Rep. of Germany ....... 2757352

[51] Int. Cl.³ .............................................. F16K 15/06
[52] U.S. Cl. .................................. 137/498; 137/503; 137/514.7; 137/533.31
[58] Field of Search ............ 137/460, 498, 503, 514.5, 137/514.7, 533.31, 533.21

[56] References Cited

U.S. PATENT DOCUMENTS

| 558,034 | 4/1896 | Brown | 137/514.5 |
|---|---|---|---|
| 931,532 | 8/1909 | Wainwright | 137/514.7 |
| 965,052 | 7/1910 | Wainwright | 137/514.7 |
| 1,029,600 | 6/1912 | Foster | 137/514.7 |
| 1,322,938 | 11/1919 | Parker | 137/514.7 |
| 1,684,987 | 9/1928 | Hazard | 137/514.5 |
| 2,568,026 | 9/1951 | Pigott | 137/514.7 X |
| 3,219,056 | 11/1965 | Dyson | 137/514.7 |
| 3,598,145 | 8/1971 | Wolfson | 137/533.21 |

FOREIGN PATENT DOCUMENTS

| 713640 | 9/1966 | Italy | 137/533.31 |
|---|---|---|---|
| 1157495 | 7/1969 | United Kingdom | 137/514.7 |

*Primary Examiner*—Robert G. Nilson
*Attorney, Agent, or Firm*—Thomas H. Murray

[57] ABSTRACT

An automatic check valve, particularly adapted for use in installations where it is desired to have the valve close automatically when a rupture occurs on the supply side of a high-pressure pipe system. The valve element for the check valve, which is adapted to move toward or away from an annular valve seat formed in a valve body between inlet and outlet ports, has a cone portion, preferably a truncated cone portion, which extends through the opening formed by the valve seat in the valve body. This truncated cone portion, which reduces the cross-sectional area presented to fluid flow through the valve as it closes upon the occurrence of a rupture, results in a damping action which prevents shocks to the piping system as the valve closes upon the occurrence of a rupture. An additional damping piston is connected to the valve element to assist in the damping action as the valve closes. The valve automatically closes in the absence of fluid flow therethrough without the use of springs or the like and will readily open with only a slight pressure differential between its inlet and outlet ports.

11 Claims, 4 Drawing Figures

AUTOMATIC LOW-FRICTION CHECK VALVE

This is a division, of application Ser. No. 969,527, filed Dec. 14, 1978, now abandoned.

BACKGROUND OF THE INVENTION

In a high-pressure pipe system, the immediate result of a rupture on the supply side of the system, which is connected to a pump or the like, is a considerable pressure drop leading to a reversal of fluid flow from the low-pressure side of the rupture opposite the pump. As fluid from the low-pressure side of the pipe system flows through the rupture, considerable acceleration of the fluid and a much higher mass flow than normal exists. Check valves have been used in high-pressure pipe systems which can respond to ruptures of this type by closing off and damaged pipes rapidly, thus preventing heavy losses of fluid through the rupture. That is, if a rupture occurs between a source of fluid under pressure and a check valve in the pipe system, the reduction in pressure on the inlet side of the check valve will permit it to close, thus preventing reverse flow of fluid beyond the check valve back through the rupture. As will be appreciated, the check valve should close with all possible speed in the interest of minimum leakage through the rupture; however, an over-abrupt closure causes a correspondingly abrupt deceleration of fluid flow with the resulting risk of pressure surges and shocks which may damage the undamaged piping or other pipe system items, particularly in the case where the fluid comprises a liquid.

Conventional check valves used in high-pressure pipe systems of the type described above usually employ a valve element in the shape of a disc, similar to an internal combustion valve element. The closing movement of a conventional disc-shaped valve of this type is relatively short, on the order of about one-third the diameter of the disc-valve element. As a result, the closing time is correspondingly short; and in the event of a flow reversal caused by a pipe rupture, the resulting above-normal pressure drop reduces the closing time still further. Provision must, therefore, be made for damping the closing movement of the check valve. At the same time, it is desirable to have the valve open with a minimum pressure differential between its inlet and outlet ports.

SUMMARY OF THE INVENTION

In accordance with the present invention, a check valve of the type described above is provided incorporating controlled damping of the closing movement of the valve, at least in its final closing phase and before complete closure, so that the fluid flowing through the valve is decelerated slowly enough to obviate any risk of oscillations, shocks or surging. At the same time, the valve element within the valve can automatically seat against a valve seat when the pressure at the valve inlet and outlet ports is the same. This eliminates the need for any springs so return the valve element of the check valve back to its seated or closed position and, at the same time, enables the valve to readily open when only a slight pressure differential exists between its inlet and outlet ports.

Specifically, in accordance with the invention, an automatic check valve is provided including a valve body having an annular valve seat interposed between inlet and outlet ports. A valve element including a cone portion, preferably a truncated cone portion, is adapted to move through an opening formed in the valve body by the valve seat and is shaped to gradually reduce the cross-sectional area of the space between the valve seat and the valve element as the valve element moves toward the seat whereby movement of the valve element is damped as it approaches the valve seat, thereby assisting in eliminating the shocks and oscillations discussed above. An annular sealing surface is provided on the valve element surrounding the base of the truncated cone portion and is engageable with the valve seat.

Additionally, a damping piston is connected to the valve element and disposed within a cylinder containing a fluid which is displaced through an orifice as the damping piston and valve approach the valve seat. Thus, the damping action takes place by virtue of the combined action of the truncated cone portion, which gradually decreases the cross-sectional area between the inlet and outlet ports of the check valve as it closes, and the action of the damping piston. The damping piston enters an associated cylinder to achieve damping action only upon final approach of the valve element toward the valve seat. This facilitates an initial rapid closing action followed by a slower, damped closing action.

In one embodiment of the invention, means are provided for automatically closing the check valve when a rupture occurs on the low-pressure side of the valve and the pressure at the inlet port of the valve rises above that at the outlet port. This is achieved by means of a secondary piston pressurized by fluid entering the inlet port and effective to force a check valve element into closed position when the pressure at the inlet port is above that at the outlet port.

The above and other objects and features of the invention will become apparent from the following detailed description taken in connection with the accompanying drawings which form a part of this specification, and in which.

Figure 1:
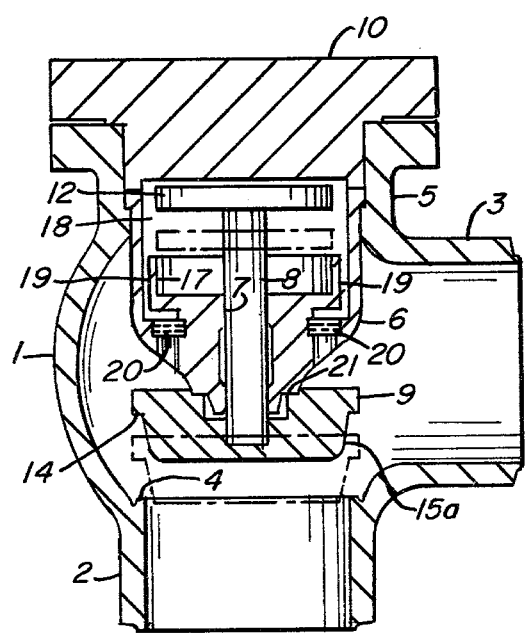
FIG. 1 is a cross-sectional view through an embodiment of the invention in which a damping piston is effective to provide a damping action only in the final phase of a closing movement of a valve element.
Figure 3:
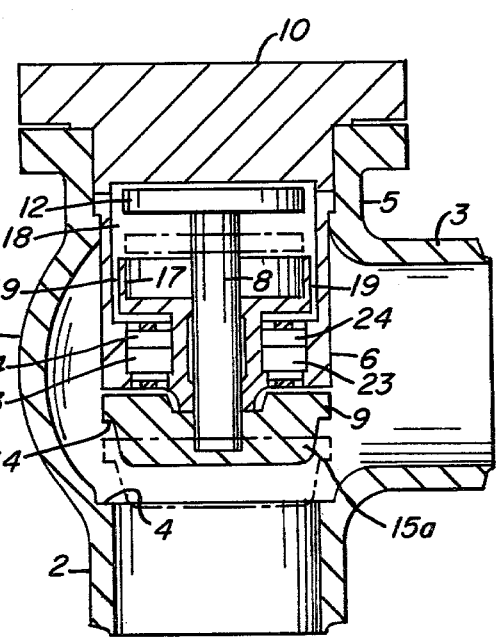
Figure 4:
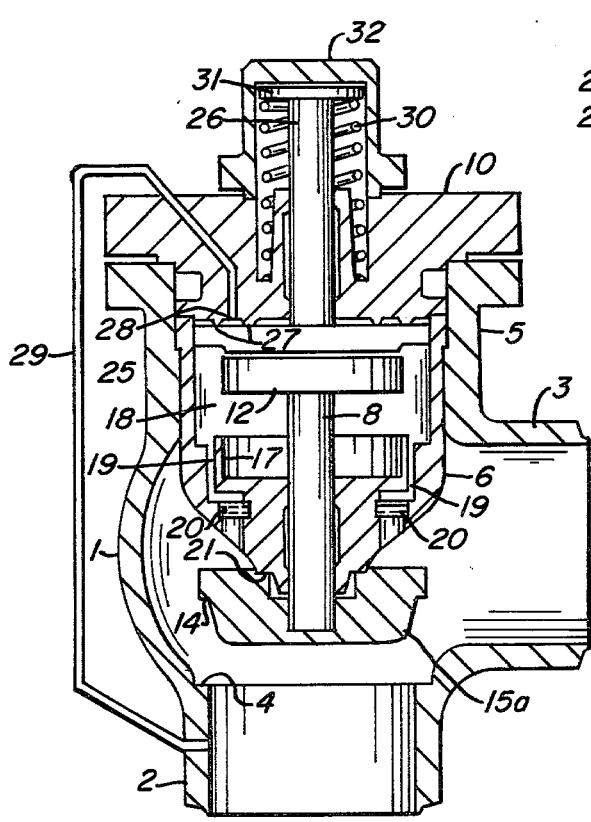

FIG. 3 is a cross-sectional view through still another embodiment of the invention, similar to that of FIG. 1, but wherein piston-type displacement members are employed to maintain the volume of the fluid within the cylinder for the damping piston constant at all times; and FIG. 4 is a cross-sectional view of still another embodiment of the invention employing a secondary piston to close the check valve upon the occurrence of a rupture in the low-pressure side of the valve.

With reference now to the drawings, and particularly to FIG. 1, the check valve shown includes a valve body 1 having an inlet port 2 and an outlet port 3. The inlet port 2, for example, may be connected to a source of a fluid under pressure while the outlet port 3 is connected to the low-pressure side of a piping system. When a rupture occurs between the inlet port 2 and a source of fluid under pressure, the fluid will tend to flow backwardly from the outlet port 3 to the inlet port 2 and thus to the point of rupture. It is during this time that the check valve should close; however, as mentioned above, the closure should be damped so as to prevent shocks and oscillations in the piping system.

Intermediate the inlet and outlet ports 2 and 3 is an annular valve seat 4. The valve seat 4 is engaged by an annular sealing surface 14 of a valve element 9 which moves downwardly from the position shown in FIG. 1 to close the valve. The valve element 9 is provided with a stem 8 which projects through a bore 7 formed in a cylindrical member 6 which abuts the inner periphery of a cylindrical extension 5 on the valve body 1. A flanged cover 10 is fitted over the upper end of the cylindrical portion 5 and is secured thereto by means of screws or bolts, not shown. Additionally, screws or bolts, not shown, are employed to secure the cylindrical member 6 to the cover 10 and hold it in position within the cylindrical portion 5.

A projection in the form of a truncated cone 15a projects from the lower surface of the valve element 9 and is surrounded at its large diameter end by the annular sealing surface 14. With the arrangement shown, it will be appreciated that as the valve element 9 and damping piston 12 move downwardly, the cone-shaped projection 15 will also move downwardly and into the inlet port 2. As the projection 15 moves downwardly, the cross-sectional area defined by the annular space presented to fluid flow between the inlet and outlet ports is gradually decreased, creating a restriction of decreasing cross-sectional area which serves to damp the movement of the valve element 9 into its seated position where the annular sealing surface 14 engages the seat 4.

As the truncated portion 15a enters the inlet port 2 (i.e., when the lower surface of the valve element passes the valve seat 4), the cross-sectional area presented to fluid flow is approximately only 10% to 20% of the rated cross section when the valve is open. It will also be noted that the damping piston 12 does not enter a damping cylinder 17 formed in chamber 18 of member 6 until the latter part of the downward stroke of valve element 9, typically about 30% to 40% of the total stroke. Consequently, it is only during the final phase of the closing movement, after the damping piston 12 has entered the cylinder 17, that there occurs a correspondingly abrupt deceleration of the closing movement. In this as in other embodiments, the main factor determining the rate of retardation is the cross-sectional area of an annular gap between the outer periphery of the damping piston 12 and the damping cylinder 17. In the embodiment of FIG. 1, the chamber 18 formed in the cylindrical member 6 communicates via ducts 19 with the interior of the valve body 1. Conventionally, strainers 20 are provided in the ducts 19 to keep dirt and debris out of the chamber 18.

During normal conditions of flow between the inlet and outlet ports 2 and 3, the flow pressure keeps the valve element 9 in its open position. During this time, abutment surface 21 of valve element 9 abuts a matching surface on cylindrical member 6. As will be appreciated, since the ducts 19 communicate with the interior of the valve body 1, the chamber 18 contains the fluid medium conducted through the valve and is at the same pressure as the fluid medium within the valve. Preferably, the piston 12 does not contact the inner periphery of the damping cylinder 17. There is, therefore, very little friction associated with movement of the valve element 9 such that in the event of pressure equalization between the inlet and outlet ports 2 and 3, the valve element 9 can drop automatically by its own weight into the closed position. On the other hand, it is also possible to provide a damping piston 12 which contacts the inner periphery of the damping cylinder 17 as a means of controlling the damping effect. Furthermore, if desired, sealing rings can be provided in the periphery of the damping piston 12 which will contact the inner periphery of the damping cylinder 17.

As will be appreciated, the volume within the chamber 18 increases during the closing movement of the valve element 9 because of the withdrawal of the stem 8 from chamber 18. However, a corresponding quantity of fluid from the valve body 1 flows through the ducts 19 and into the chamber 18 so that no pressure difference is produced.

Figure 2:
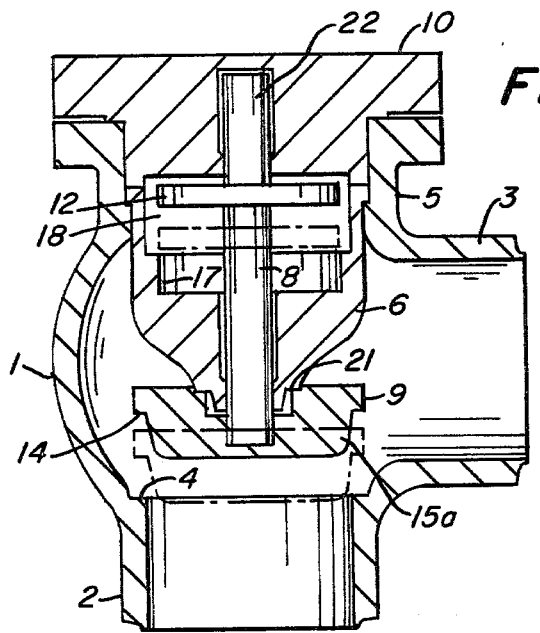
FIG. 2 is a cross-sectional view through an embodiment of the invention, similar to that shown in FIG. 1, but wherein a displacement member is connected to a damping piston such that the fluid within the cylinder within which the damping piston reciprocates will always be of the same volume.

In FIG. 2, an embodiment of the invention similar to that of FIG. 1 is shown except that the ducts 19 are eliminated. In this embodiment, a displacement member or extension 22 is secured to the top of the damping piston 12 and is guided in a blind bore provided in the valve cover 10. Since the displacement member 22 has the same cross-sectional area as the stem 8, the volume of the liquid within the chamber 18 will not change during the closing movement. There is, therefore, no need for connection between the chamber 18 and the interior of the valve body 1.

The embodiment of FIG. 3 is similar to that of FIG. 1 in that it is provided with bores 24 which communicate with ducts 19 in the cylindrical member 6. In this case, the bores 24 contain floating pistons 23. During the closing movement of the valve element 9 in the embodiment of FIG. 3, the pistons 23 move upwardly toward the chamber 18 and thus compensate for a decrease in the volume of the fluid within the chamber 18 as the damping piston 12 moves downwardly.

FIG. 4 shows an embodiment of the invention having damping similar to that of the embodiment of FIG. 1 but including the additional feature of providing automatic closing of the check valve against an inlet pressure. Again, elements in FIG. 4 which correspond to those of FIG. 1 are identified by like reference numerals. Disposed above the damping piston 12 in the embodiment of FIG. 4 is an additional piston 25 of larger diameter than the valve element 9. The piston 25 is secured to a piston rod 26 guided for axial movement in a bore in the valve cover 10. On the back of the additional piston 25 are two sealing surfaces which engage with two concentric annular projections 27 formed on the underside of the cover 10. As a result, an annular chamber 28 is formed between the projections 27 and the additional piston 25. This annular chamber 28 communicates via a bypass conduit 29 with the valve inlet port 2.

In the event that a pipe connected to the outlet port 3 ruptures, there is a considerable increase in the pressure drop and more fluid flows through the valve. Because of this increased flow rate, the pressure drop across the valve increases, meaning that the pressure at the valve inlet port 2 is much higher than at the valve outlet port 3. The pressure at inlet port 2 thus acts via the bypass conduit 29 on the back of the additional piston 25, the front face thereof experiencing the lower pressure at the valve outlet port by virtue of the connection between chamber 18 and the interior of valve body 1 through ducts 19. The force resulting from the pressure difference between the upper and lower surfaces of the additional piston 25 forces the valve element 9 into sealing engagement with the valve seat 4. During the closing movement, entry of the damping piston 12 into the damping cylinder 17 provides damping of the closing movement.

During normal conditions of operation or in the event of a rupture in the supply line connected to inlet port 2, the additional piston 25 is maintained in its uppermost position shown in FIG. 4 by a compression spring 30 which engages the underside of a disc 31 connected to the upper end of the piston rod 26 which is housed within housing 32 secured to the valve cover 10 by means of screws or the like, not shown. In the event of a rupture in the supply line, the pressure at inlet port 2 will be lower than that at outlet port 3 with the result that the pressure differential between the upper and lower surfaces of the additional piston 25 will cause it to be retained in its uppermost position shown in FIG. 6 by the spring 30. That is to say, the pressure differential between the inlet port 2 and the outlet port 3, plus the weight of the additional piston 25, cannot overcome the opposing force of the spring 30 when a rupture occurs in the supply line. The sealing surfaces provided by the two concentric annular projections 27 prevent any leakage from the outlet port 3 to the inlet port 2 via bypass conduit 29 once the valve has closed in its normal checking function.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. An automatic check valve including a valve body having an annular valve seat interposed between inlet and outlet ports, a valve element including a truncated cone portion adapted to move through an opening formed in the valve body by said valve seat and shaped to gradually reduce the cross-sectional area of the space between the valve seat and the valve element as the valve element moves toward the seat whereby the movement of the valve element will be damped as it approaches the valve seat, an annular sealing surface on said valve element surrounding the large diameter end of said truncated cone portion and engageable with said valve seat, and a damping piston connected to the valve element and adapted to enter a cylinder containing a fluid which is displaced through an orifice as the damping piston and valve approach the valve seat, said damping piston entering said cylinder only during the final phase of movement of the valve element toward the valve seat.

2. The automatic check valve of claim 1 wherein an annular gap is provided between the outer periphery of said damping piston and the inner periphery of said cylinder containing a fluid such that as fluid flows through said annular gap as said piston moves within the cylinder, a damping effect is achieved.

3. A check valve according to claim 1 wherein said final phase of movement of the valve element as said damping piston enters said cylinder comprises 30% to 40% of the total stroke of the valve element.

4. A check valve according to claim 1 wherein the cross-sectional area presented to fluid flow when the truncated cone portion initially enters said opening formed in the valve body is about 10% to 20% of the rated cross section of said opening when the valve is open.

5. A check valve according to claim 1 wherein said cylinder containing a fluid is isolated from the interior of said valve body.

6. The automatic check valve of claim 1 wherein said damping piston is connected to the valve element through a valve stem and including a displacement member secured to said damping piston on the side thereof opposite said valve stem and guided in a bore above the damping piston, and displacement member having the same cross-sectional area as the valve stem such that as the damping piston and valve element approach the valve seat, the displacement member will compensate for the loss of fluid in said cylinder due to a shortening of the valve stem within said cylinder.

7. The automatic check valve of claim 1 wherein said cylinder containing a fluid is connected through ducts with the interior of said valve body.

8. The automatic check valve of claim 7 including floating pistons disposed within said ducts, said floating pistons moving toward said cylinder as said damping piston and valve element approach the valve seat.

9. The automatic check valve of claim 1 including a second piston in said cylinder containing a fluid on the side of said damping piston opposite said valve element, said second piston having a diameter greater than that of the valve element, a pressure chamber on the side of said second piston opposite said damping piston, and a conduit connecting said pressure chamber to said inlet port of the check valve.

10. The automatic check valve of claim 9 wherein the side of said second piston opposite said damping piston engages annular projections formed on an end surface of said cylinder, said annular projections forming said pressure chamber.

11. The automatic check valve of claim 10 including spring means for restraining movement of said second piston toward said damping piston.

* * * * *